McCLELLAN C. FULLENLOVE.
MOTION PICTURE SHUTTER.
APPLICATION FILED JAN. 21, 1920.
1,353,527.
Patented Sept. 21, 1920.
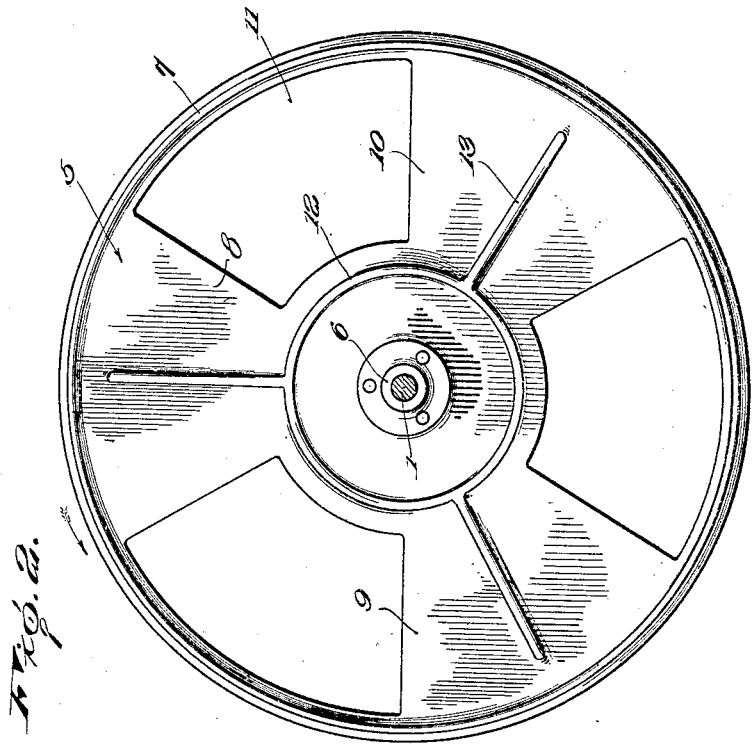
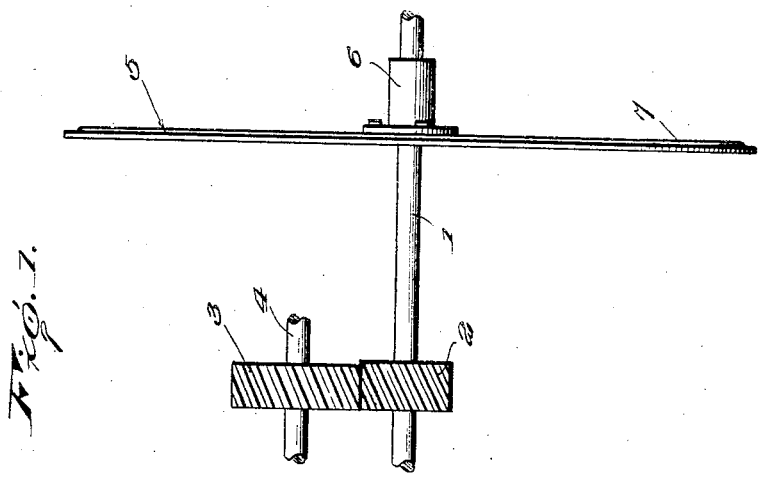

UNITED STATES PATENT OFFICE.

McCLELLAN C. FULLENLOVE, OF LOUISVILLE, KENTUCKY, ASSIGNOR TO PERFECT PROJECTION SHUTTER COMPANY, INC., OF LOUISVILLE, KENTUCKY, A CORPORATION OF KENTUCKY.

MOTION-PICTURE SHUTTER.

1,353,527.     Specification of Letters Patent.     Patented Sept. 21, 1920.

Application filed January 21, 1920. Serial No. 352,930.

*To all whom it may concern:*

Be it known that I, McCLELLAN C. FULLENLOVE, a citizen of the United States, residing at Louisville, in the county of Jefferson and State of Kentucky, have invented certain new and useful Improvements in Motion-Picture Shutters, of which the following is a specification.

It is well recognized that, in the art of projecting motion pictures, an ideal shutter arrangement is one which will practically entirely eliminate flicker and which will permit of the passage of a maximum amount of light from the projection apparatus to the screen so as to obtain a maximum illumination and consequently a depth of focus which will distinctly bring out the details of the picture. It should be possible to best obtain these results by the use of a shutter having three wings or interrupters all of equal area and the spaces between the wings or interrupters being likewise all of equal area. However, the difficulty which has heretofore been experienced in utilizing a shutter of this nature is that the blades or interrupters have been too small in area to completely cut off the light rays during the entire period of shifting of the film, where the shutter has been driven in the ordinary manner and as a result the shifting becomes apparent, manifesting itself by what is known as "light rain." To overcome this disadvantage it has been customary to employ a shutter comprising three blades or interrupters and to form one of the blades of greater area than either of the other two, this larger blade alone constituting the occulting blade of the shutter and the two smaller blades being intended to reduce flicker by somewhat reducing the amount of light passing from the projection apparatus to the screen. In practice such a shutter is rotated one complete revolution for each cycle of operation of the film shifting mechanism of the motion head. In view of the foregoing the present invention has as one of its objects to provide a balanced three wing shutter, by which expression I mean a shutter having three wings all of equal area and separated by intervening spaces likewise of equal area, means being provided whereby the gear ratio between the operating mechanism of the motion head and the shutter shaft will be such that the shutter will be revolved two-thirds of a revolution in each cycle of operation of the film shifting mechanism of the motion head so that in the rotation of the shutter, successively alternate blades or interrupters thereof will perform the function of occulting the light rays, the successively intervening blades, in passing before the lens of the projecting apparatus, serving to reduce or practically eliminate flicker. Thus the present invention has as its object to provide a shutter for a motion picture projection apparatus which will provide for the projection of pictures unaccompanied by flicker or "light rain" and with a maximum illumination of the screen so as to greatly increase the depth of focus and thus distinctly bring out the details of the picture.

In the accompanying drawings:

Figure 1 is a side elevation of the shutter and operating means therefor;

Fig. 2 is a front elevation of the shutter.

In the drawings the numeral 1 indicates the shutter shaft and the numeral 2 a pinion which is fixed upon the said shaft. This pinion meshes with a gear or pinion 3 which is fixed upon a shaft 4 which is the usual shaft of the motion head from which the shutter shaft is driven. Inasmuch as the shutter of the present invention may be employed in connection with any of the numerous types of motion heads it is thought unnecessary to illustrate in detail the operating mechanism of the motion head by which the film is fed past the aperture in the film gate. It will suffice to say that whereas in the ordinary forms of shutters the shaft 1 is rotated one complete revolution for each cycle of operation of the film feeding mechanism, in the present invention the ratio between the gears 2 and 3 is such that the shaft 1 will be rotated two-thirds of a complete revolution during each cycle of operation of the film feeding mechanism. Consequently it may be found necessary to vary the form of gear connection between the shafts 1 and 4 and to variously proportion the gears which transmit motion from the shaft 4 to the said shaft 1 but such modifications will, of course, fall within the scope of the present invention so long as the shutter shaft is as stated rotated two-thirds of a revolution in each cycle of operation of the film feeding mechanism.

The shutter is indicated in general by the numeral 5 and the said shutter comprises a hub 6 which is suitably secured to the shaft 1, a rim 7 concentric to the hub, and a set of three wings or interrupters, one indicated by the numeral 8, another by the numeral 9 and a third by the numeral 10, the wings or interrupters being separated by intervening spaces 11 which are likewise of segmental form. It will be observed by reference to Fig. 2 of the drawings that the occulting portions of the shutter, namely, the wings or interrupters 8, 9 and 10 have an effective surface area exactly equal to the area of the spaces 11 and that all of the wings are of equal area as are also all of the spaces. Thus the shutter is a truly balanced one as regards its clear and occulting portions. In operation the shutter will be rotated in the direction indicated by the arrow in Fig. 2 of the drawings and assuming that in the position shown in Fig. 2, the wing 8 is in front of the lens set of the projection apparatus or is otherwise located so as to intercept the light rays from the source of illumination, the film feeding mechanism will at such time be operating to shift the film one picture space. As the shutter rotates in the direction indicated by the arrow, the blade 10 will cross the path of the light rays as will also the space between the blades 8 and 10 and the space between the blades 10 and 9. During this period the film will be stationary and it is not again shifted until the wing 9 of the shutter reaches or substantially reaches the position occupied by the wing 8 in Fig. 2. In this cycle of operation of the shutter, the wing 8 first masks the shifting of the film; the light rays are permitted to pass through the then stationary film and to the screen through the spaces 11 between the wings 8 and 10 and 10 and 9, the wing 10 serving, as it crosses the light rays, to eliminate the flicker; and, finally the wing 9 masks the film as it is next shifted. In the next succeeding cycle of operation of the shutter, the space 11 between the wings 9 and 8 will pass across the path of the light rays as will also the wing 8 and then the space between the wings 8 and 10, and finally the wing 10 will intercept these rays as the film is again shifted. Thus, in the continuous rotary motion of the shutter, alternately successive ones of the wings serve as occulting portions and the successive intervening wings serve to prevent flicker.

If desired, the central portion of the shutter may be provided with a concentric reinforcement 12 and the wings 8, 9 and 10 may be formed with radial reinforcements 13.

Having thus described the invention, what is claimed as new is:

1. A shutter of the class described having a series of three interrupters and intervening spaces all of equal effective area, and means for rotating the shutter at a speed of two-thirds of a revolution to each cycle of operation of the film feeding mechanism.

2. A shutter of the class described having a series of three interrupters and intervening spaces all of equal effective area, and means for rotating the shutter at such speed in ratio to the operation of the film feeding mechanism that successively alternate ones of the interrupters will intercept the light rays during the successive stationary periods of the film.

3. A shutter of the class described having a series of interrupters and intervening spaces all of equal effective area, and means for rotating the shutter at such speed in ratio to the operation of the film feeding mechanism that alternate interrupters will intercept the light rays during the successive stationary periods of the film.

In testimony whereof I affix my signature.

McCLELLAN C. FULLENLOVE. [L. S.]